United States Patent
Wakayama

(10) Patent No.: US 7,028,821 B2
(45) Date of Patent: Apr. 18, 2006

(54) SYSTEM AND METHOD FOR CONTROLLING HYDRAULIC PRESSURE OF AUTOMATIC TRANSMISSION INCLUDING LOCKUP CONTROL VALVE

(75) Inventor: Hideshi Wakayama, Kanagawa (JP)

(73) Assignee: JATCO Ltd, Fuji (JP)

(*) Notice: Subject to any disclaimer, the term of this patent is extended or adjusted under 35 U.S.C. 154(b) by 0 days.

(21) Appl. No.: 10/670,223

(22) Filed: Sep. 26, 2003

(65) Prior Publication Data
US 2004/0063543 A1    Apr. 1, 2004

(30) Foreign Application Priority Data
Sep. 30, 2002    (JP)    ............... 2002-285501

(51) Int. Cl.
*F16H 61/14*    (2006.01)
(52) U.S. Cl. .................... 192/3.3; 477/62
(58) Field of Classification Search .......... 474/8; 477/38, 45, 62; 475/65, 61, 64; 192/3.29, 192/3.3
See application file for complete search history.

(56) References Cited

U.S. PATENT DOCUMENTS 4,582,185 A * 4/1986 Grimes et al. ............. 192/3.3
6,066,072 A * 5/2000 Adachi .................... 477/176
6,652,415 B1* 11/2003 Segawa et al. ............. 477/62
2001/0027143 A1* 10/2001 Nakano et al. ............. 474/28
2002/0052265 A1* 5/2002 Segawa et al. ............. 477/62
2004/0157700 A1   8/2004 Katou

FOREIGN PATENT DOCUMENTS

JP    4-203560 A    *    7/1992

OTHER PUBLICATIONS

U.S. Appl. No. 10/674,069, filed Sep. 30, 2003, Sawada et al.
U.S. Appl. No. 10/664,031, filed Sep. 17, 2003, Yamamoto et al.

(Continued)

*Primary Examiner*—Rodney H. Bonck
(74) *Attorney, Agent, or Firm*—Foley & Lardner LLP

(57) ABSTRACT

A system for controlling a hydraulic pressure of an automatic transmission includes a torque converter having a lockup clutch for direct coupling between an engine and the transmission, a lockup solenoid valve for providing a signal pressure for controlling engagement of the lockup clutch, a lockup control valve for providing an engagement pressure to the lockup clutch in accordance with the signal pressure, and a CVT control unit for controlling the lockup solenoid valve. The CVT control unit is programmed to determine torque provided to the torque converter and control the signal pressure in accordance with the torque.

3 Claims, 5 Drawing Sheets

OTHER PUBLICATIONS

U.S. Appl. No. 10/674,091, filed Sep. 30, 2003, Jozaki et al.
U.S. Appl. No. 10/670,270, filed Sep. 26, 2003, Nobu.
U.S. Appl. No. 10/670,271, filed Sep. 26, 2003, Nobu.
U.S. Appl. No. 10/662,442, filed Sep. 16, 2003, Ochiai et al.
U.S. Appl. No. 10/673,549, filed Sep. 30, 2003, Sawada et al.
U.S. Appl. No. 10/670,775, filed Sep. 26, 2003, Shimanaka et al.

* cited by examiner

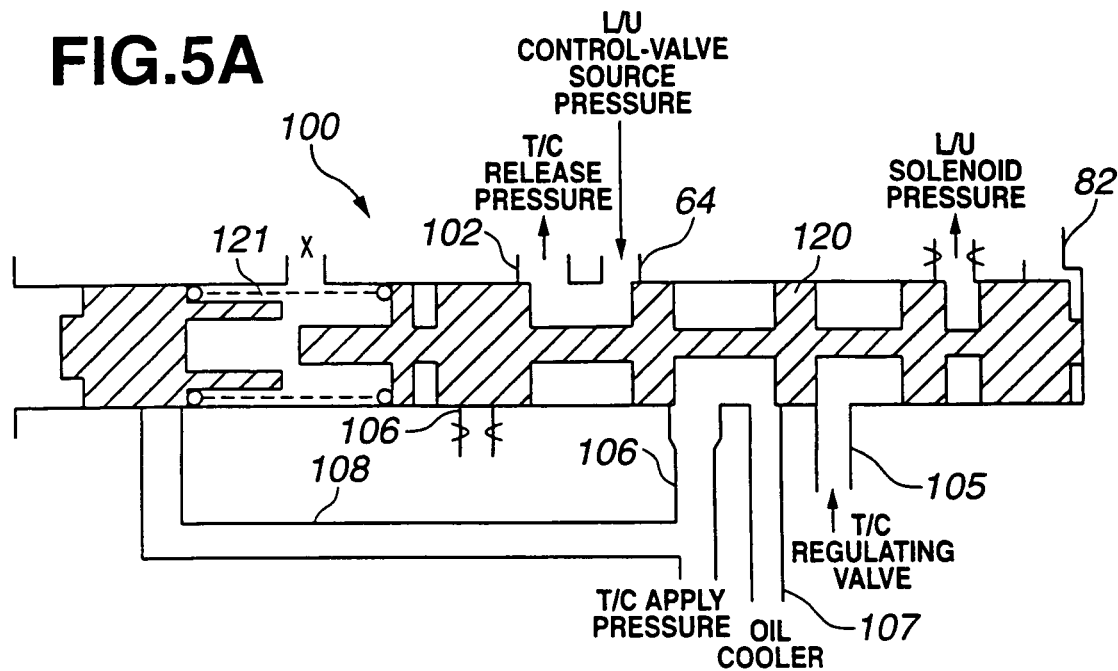
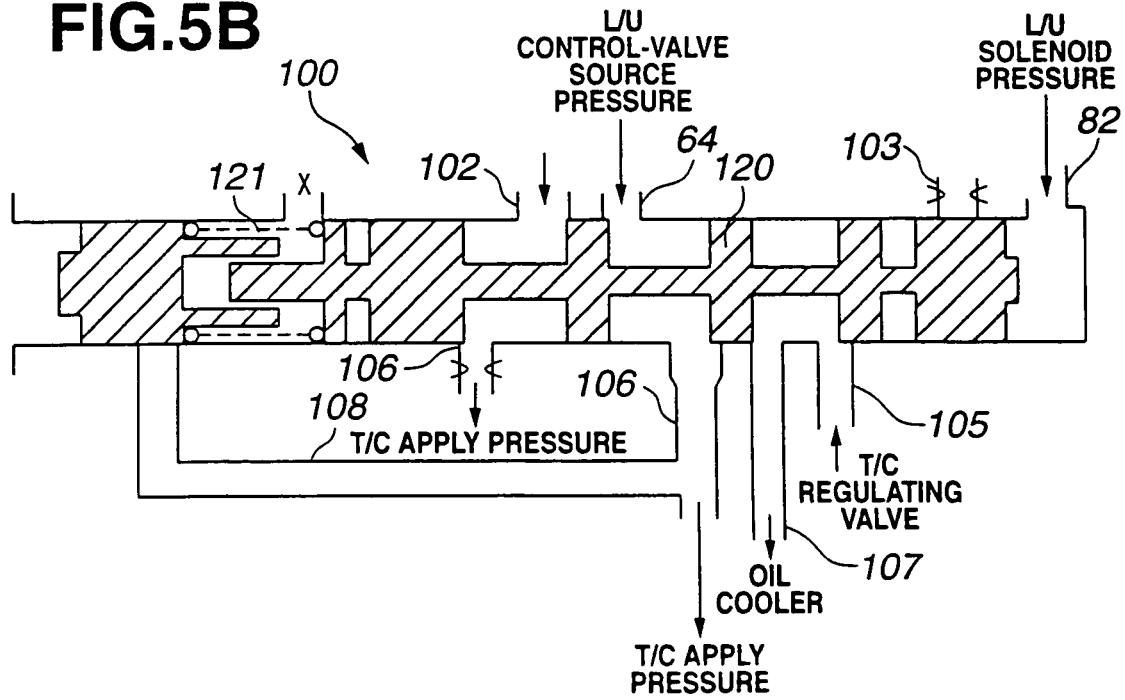

SYSTEM AND METHOD FOR CONTROLLING HYDRAULIC PRESSURE OF AUTOMATIC TRANSMISSION INCLUDING LOCKUP CONTROL VALVE

BACKGROUND OF THE INVENTION

The present invention relates to a system for controlling the hydraulic pressure of an automatic transmission including a lockup control valve.

Typically, a hydraulic circuit for a V-belt type continuously variable transmission (CVT) comprises a lockup control valve for engaging a lockup clutch of a torque converter for direct coupling between an engine and a CVT. The lockup control valve bifurcates the hydraulic pressure drained from a clutch regulating valve into two pressures of the apply side and release side of the torque converter in accordance with a signal output from a lockup solenoid. By controlling a differential pressure between the apply-side and release-side pressures, the lockup control valve carries out engagement and disengagement of the lockup clutch.

The lockup solenoid includes a linear solenoid valve which changes a constant pilot pressure supplied from a pilot valve in accordance with a control signal output from a CVT control unit to provide it, as a signal pressure, to the lockup control valve. The linear solenoid valve has the advantage of higher responsivity than a duty control valve.

The lockup solenoid receives the pilot pressure through an input port to provide it, as a lockup-solenoid source pressure, through an output port. The lockup solenoid changes the volume defined between a valve element arranged at an end of a plunger and a bearing surface formed on a valve chest by a balance between a biasing force of the solenoid and the pilot pressure, thus changing the pilot pressure to a desired pressure.

With the above hydraulic circuit, an indicated value of the differential pressure of the lockup solenoid after engagement of the lockup clutch is set at a maximum value at all times to maximize an engagement capacity of the torque converter. Thus, a spool of the lockup control valve is in the fully biased state at all times to increase the load rigidity of a particular hydraulic passage as viewed from the lockup solenoid.

Thus, during high engine rotation having increased surging of the line pressure as source pressure of the pilot pressure, surging of the pilot pressure as source pressure of the lockup solenoid is increased, resulting in possible deterioration in the pressure-control stability of the lockup solenoid.

Further, if the pressure-control stability of the lockup solenoid is deteriorated, an indicated value of the differential pressure varies to reduce the engagement capacity of the lockup clutch, having engagement of the lockup clutch released, leading to possible degradation in fuel consumption.

A solution for absorbing surging of the pilot pressure lies in interposing an accumulator between the pilot valve and the lockup solenoid. However, this solution involves an increase in the number of parts, leading to increase in manufacturing cost and degradation in the vehicle mountability.

Another solution lies in setting the source pressure of the lockup control valve, i.e. the discharge capacity of an oil pump, at a fully high value. However, this solution involves provision of the source pressure of the lockup control valve greater than the differential pressure required for a maximum engagement capacity of the lockup clutch, increasing a load to the engine for driving the oil pump, causing degradation of fuel consumption.

SUMMARY OF THE INVENTION

It is, therefore, an object of the present invention to provide a system for controlling the hydraulic pressure of an automatic transmission including a lockup control valve, which allows achievement of the control stability of the lockup clutch at all times.

The present invention provides generally a system for controlling a hydraulic pressure of an automatic transmission, which comprises: a torque converter comprising a lockup clutch, the lockup clutch carrying out direct coupling between an engine and the transmission; a lockup solenoid valve which provides a signal pressure for controlling engagement of the lockup clutch; a lockup control valve which provides an engagement pressure to the lockup clutch in accordance with the signal pressure; and a control unit which controls the lockup solenoid valve, the control unit being programmed to: determine a torque provided to the torque converter; and control the signal pressure in accordance with the torque.

BRIEF DESCRIPTION OF THE DRAWINGS

The other objects and features of the present invention will become apparent from the following description with reference to the accompanying drawings, wherein:

FIG. 5A is a schematic sectional view showing a second embodiment of the present invention; and FIG. 5B is a view similar to FIG. 5A, showing the second embodiment.

DETAILED DESCRIPTION OF THE INVENTION

Figure 1:
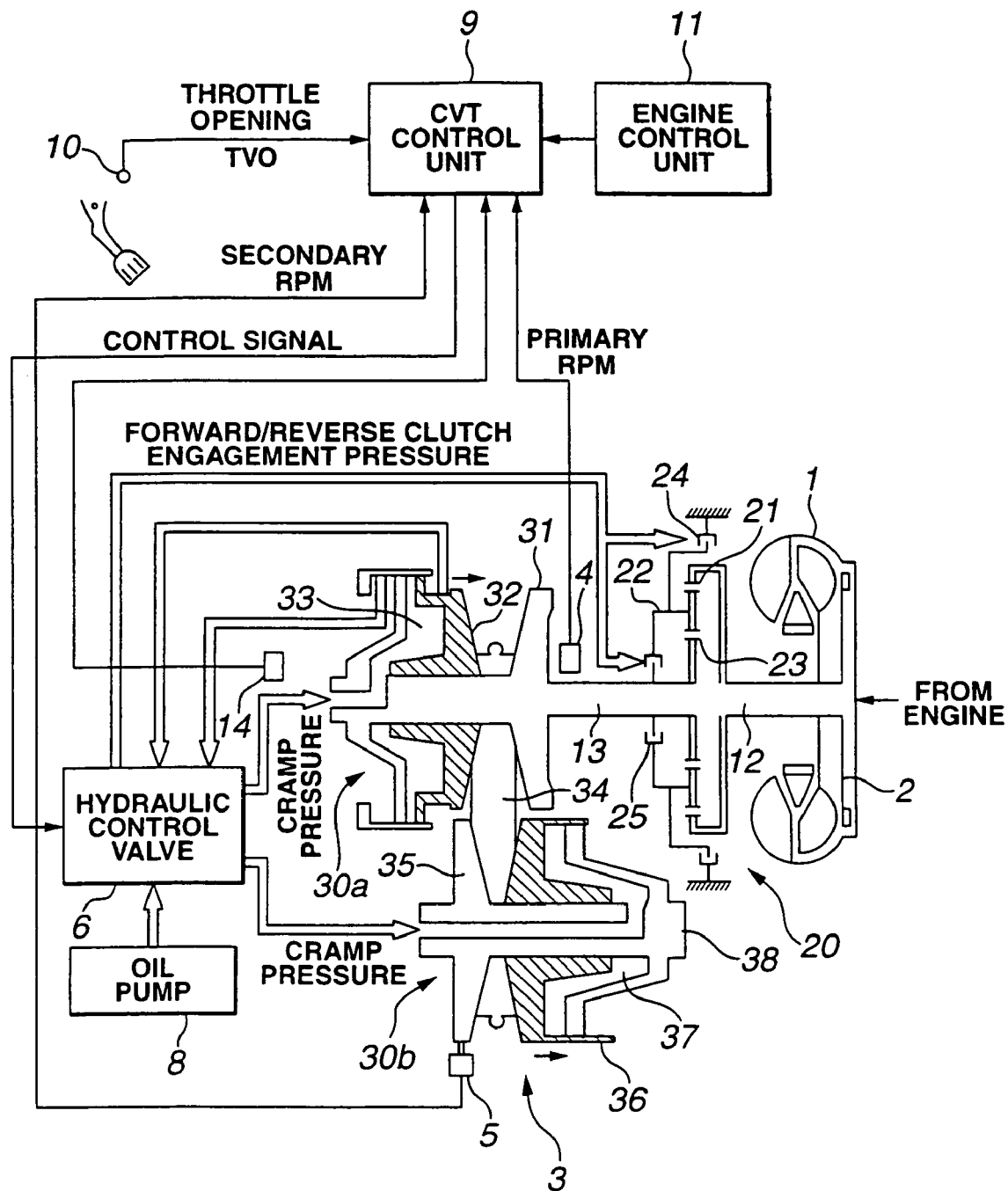
FIG. 1 is a block diagram showing a first embodiment of a hydraulic control system for an automatic transmission including a lockup control valve according to the present invention.

Referring to the drawings, a description is made about a hydraulic control system for an automatic transmission including a lockup control valve embodying the present invention.

Referring to FIG. 1, there is shown first embodiment of the present invention. The hydraulic control system comprises a torque converter 1, a lockup clutch 2, a V-belt type CVT 3, a primary rpm sensor 4, a secondary rpm sensor 5, a hydraulic control valve unit 6, an oil pump 8 driven by an engine, not shown, a CVT control unit (CVTCU) 9, a throttle-opening sensor 10, and an engine control unit (ECU) 11.

The engine includes an output shaft 12 to which the torque converter or rotation transfer mechanism 1 is coupled, and to which a lockup clutch 2 is provided for direct coupling between the engine and the CVT 3. The torque converter 1 has an output side coupled to a ring gear 21 of a forward/reverse switching mechanism 20. The forward/reverse switching mechanism 20 comprises a planetary-gear set comprising the ring gear 21 coupled to the engine output shaft 12, a pinion carrier 22, a sun gear 23 coupled to a transmission input shaft 13. Provided to the pinion carrier 22 are a reverse brake 24 for fixing the pinion carrier 22 to a transmission casing, and a forward clutch 25 for integrally coupling the transmission input shaft 13 to the pinion carrier 22.

A primary pulley 30a of the CVT 3 is arranged at an end of the transmission input shaft 13. The CVT 3 comprises primary pulley 30a, a secondary pulley 30b, and a belt 34 for transferring torque of the primary pulley 30a to the secondary pulley 30b. The primary pulley 30a comprises a stationary conical plate 31 rotating together with the transmission input shaft 13, and a movable conical plate 32 disposed opposite to the stationary conical plate 31 to form a V-shaped pulley groove and being axially movable in accordance with the hydraulic pressure acting on a primary-pulley cylinder chamber 33.

The secondary pulley 30b is arranged on a driven shaft 38, and comprises a stationary conical plate 35 rotating together with the driven shaft 38 and a movable conical plate 36 disposed opposite to the stationary conical plate 35 to form a V-shaped pulley groove and being axially movable in accordance with the hydraulic pressure acting on a secondary-pulley cylinder chamber 37.

A drive gear, not shown, is fixed to the drive shaft 38 so as to drive a drive shaft extending to wheels, not shown, through a pinion, final gear, differential gear provided to an idler shaft.

Torque of the engine output shaft 12 is transferred to the CVT 3 through the torque converter 1 and the forward/reverse switching mechanism 20. Torque of the transmission input shaft 13 is transferred to the differential gear through the primary pulley 30a, belt 34, secondary pulley 30b, driven shaft 38, drive gear, idler gear, idler shaft, pinion, and final gear.

When the above power transfer is carried out by axially moving the movable conical plates 32, 36 of the primary and secondary pulleys 30a, 30b to change the contact radius with respect to the belt 34, the rotation ratio between the primary and secondary pulleys 30a, 30b, i.e. shift ratio, can be changed. Such control for changing the width of the V-shaped pulley groove is carried out by the CVTCU 9 through hydraulic control to the primary-pulley cylinder chamber 33 or the secondary-pulley cylinder chamber 37.

The CVTCU 9 receives a throttle-opening signal from the throttle-opening sensor 10, a primary-rpm signal from the primary rpm sensor 4, a secondary-rpm signal from the secondary rpm sensor 5, an engine-torque signal from the ECU 11, and a cramp pressure from a pulley cramp-pressure sensor 14. A control signal is calculated in accordance with the input signals to provide it to the hydraulic control valve unit 6.

The hydraulic control valve unit 6 receives a control signal from the CVTCU 9 to provide the control pressures to the primary-pulley cylinder and secondary-pulley cylinder chambers 33, 37, thus carrying out shift control.

Figure 2:
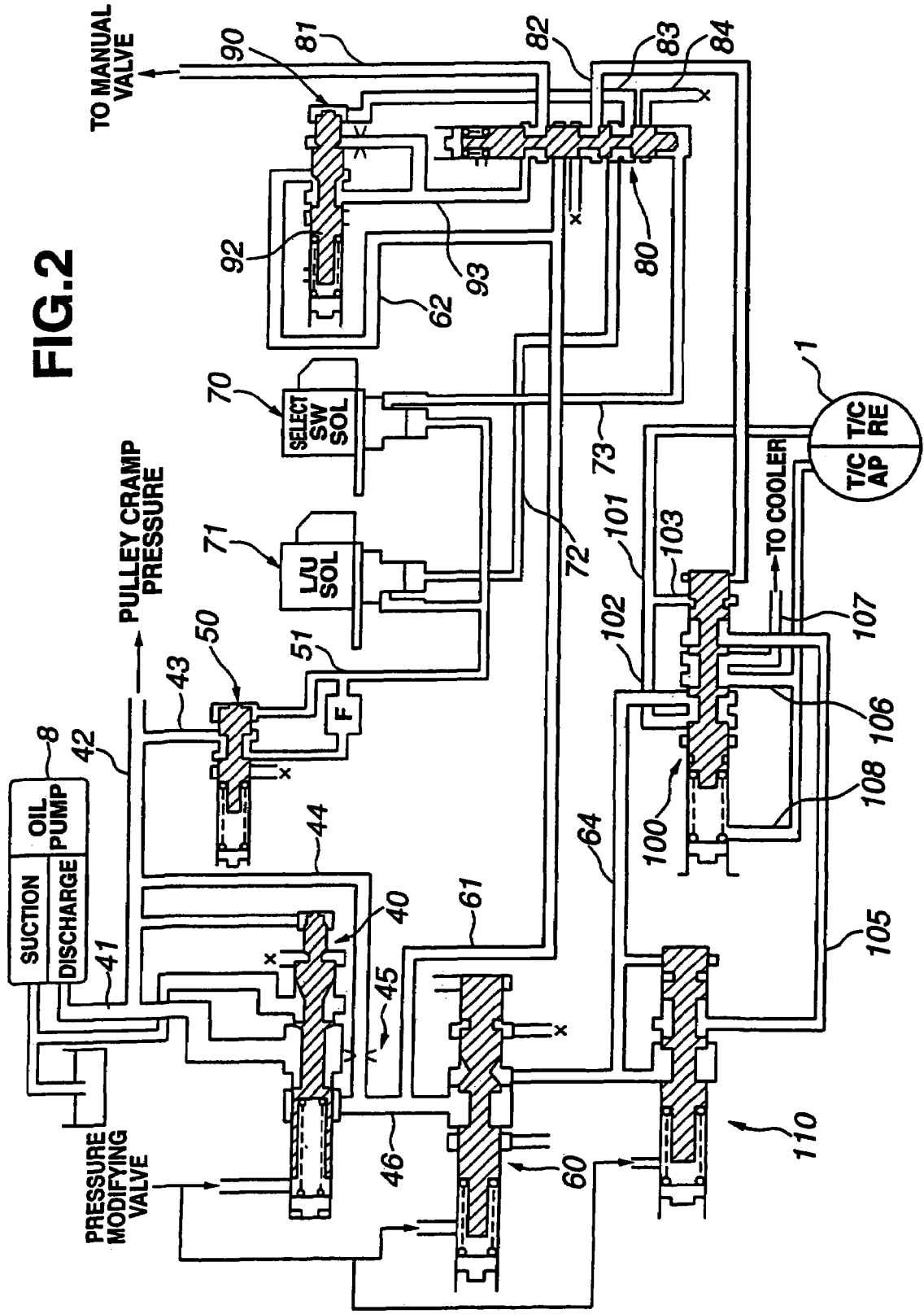
FIG. 2 is a diagram showing a hydraulic circuit for the automatic transmission.

Referring to FIG. 2, the hydraulic circuit comprises a pressure regulating valve 40 for regulating the discharge pressure of the oil pump 8 supplied through a hydraulic passage 41 to serve as the line pressure or pulley cramp pressure. The hydraulic passage 41 communicates with a hydraulic passage 42. The hydraulic passage 42 is a pulley-cramp-pressure supply passage which supplies the pulley cramp pressure for cramping the belt 34 to the primary-pulley cylinder and secondary-pulley cylinder chambers 33, 37 of the CVT 3. A hydraulic passage 43 communicating with the hydraulic passage 42 serves to supply the source pressure of a pilot valve 50.

The hydraulic pressure drained from the pressure regulating valve 40 is supplied to a clutch regulating valve 60 through a hydraulic passage 46. By achieving the hydraulic pressure lower than that produced by the pressure regulating valve 40 in such a manner, the hydraulic pressure serving as the engagement pressure of a forward clutch is prevented from exceeding the pulley cramp pressure.

The hydraulic passage 46 communicates with a hydraulic passage 44 communicating with the hydraulic passage 42 and having an orifice 45. The clutch regulating valve 60 regulates the hydraulic pressures within hydraulic passages 46, 61. The hydraulic pressure within the hydraulic passage 61 is supplied to a select switching valve 80 and a select control valve 90.

The pilot valve 50 serves to set a constant supply pressure to a lockup solenoid valve 71 and a select switching solenoid valve 70 through a hydraulic passage 51. The output pressure of the select switching solenoid valve 70 is supplied to the select switching valve for operation control thereof. The output pressure of the lockup solenoid valve 71 is supplied to the select switching valve 80.

The select switching valve 80 is actuated by the select switching solenoid valve 70 via a hydraulic passage 73. Connected to input ports of the select switching valve 80 are a hydraulic passage 72 for supplying the signal pressure of the lockup solenoid valve 71, hydraulic passage 61 having hydraulic pressure regulated by the clutch regulating valve 60, and a hydraulic passage 93 having hydraulic pressure regulated by the select control valve 90. Connected to output ports of the select switching valve 80 are a hydraulic passage 81 for supplying the forward-clutch pressure to a manual valve, not shown, a hydraulic passage 82 for supplying the hydraulic pressure to a lockup control valve 100, a hydraulic passage 83 for supplying the hydraulic pressure for actuating a spool 92 of the select control valve 90, and a hydraulic passage 84 for draining the hydraulic pressure from the select switching valve 80.

Connected to the select control valve 90 are a hydraulic passage 62 having hydraulic pressure regulated by the clutch regulating valve 60 and hydraulic passage 93 for supplying the signal pressure of the lockup solenoid valve 71. The select control valve 90 controls communication between the hydraulic passages 62, 93, thus regulating the hydraulic pressure.

With a signal of the select switching solenoid valve 70 turned on, the signal pressure of the lockup solenoid valve 71 operates as the signal pressure of the select control valve 90 through the select switching valve 80. And the hydraulic pressure regulated by the select control valve 90 is supplied to the manual valve.

On the other hand, with a signal of the select switching solenoid valve 70 turned off, the signal pressure of the lockup solenoid valve 71 is supplied to the lockup control valve 100 through the select switching valve 80.

Connected to input ports of the lockup control valve 100 are a hydraulic passage 64 having hydraulic pressure drained from the clutch regulating valve 60 and regulated by a torque-converter regulating valve 110 and a hydraulic passage 105 having hydraulic pressure drained from the torque-converter regulating valve 110.

On the other hand, connected to output ports of the lockup control valve 100 are hydraulic passages 102, 103 for supplying the release pressure to the torque converter 1, hydraulic passages 106, 108 for supplying the apply pressure to the torque converter 1, and a hydraulic passage 107 for draining the hydraulic passage from the lockup control valve 100 to an oil cooler, not shown.

The torque-converter regulating valve 110 regulates the hydraulic pressure drained from the clutch regulating valve 60 to supply it to the lockup control valve 100 through the hydraulic passage 64.

Figure 3:
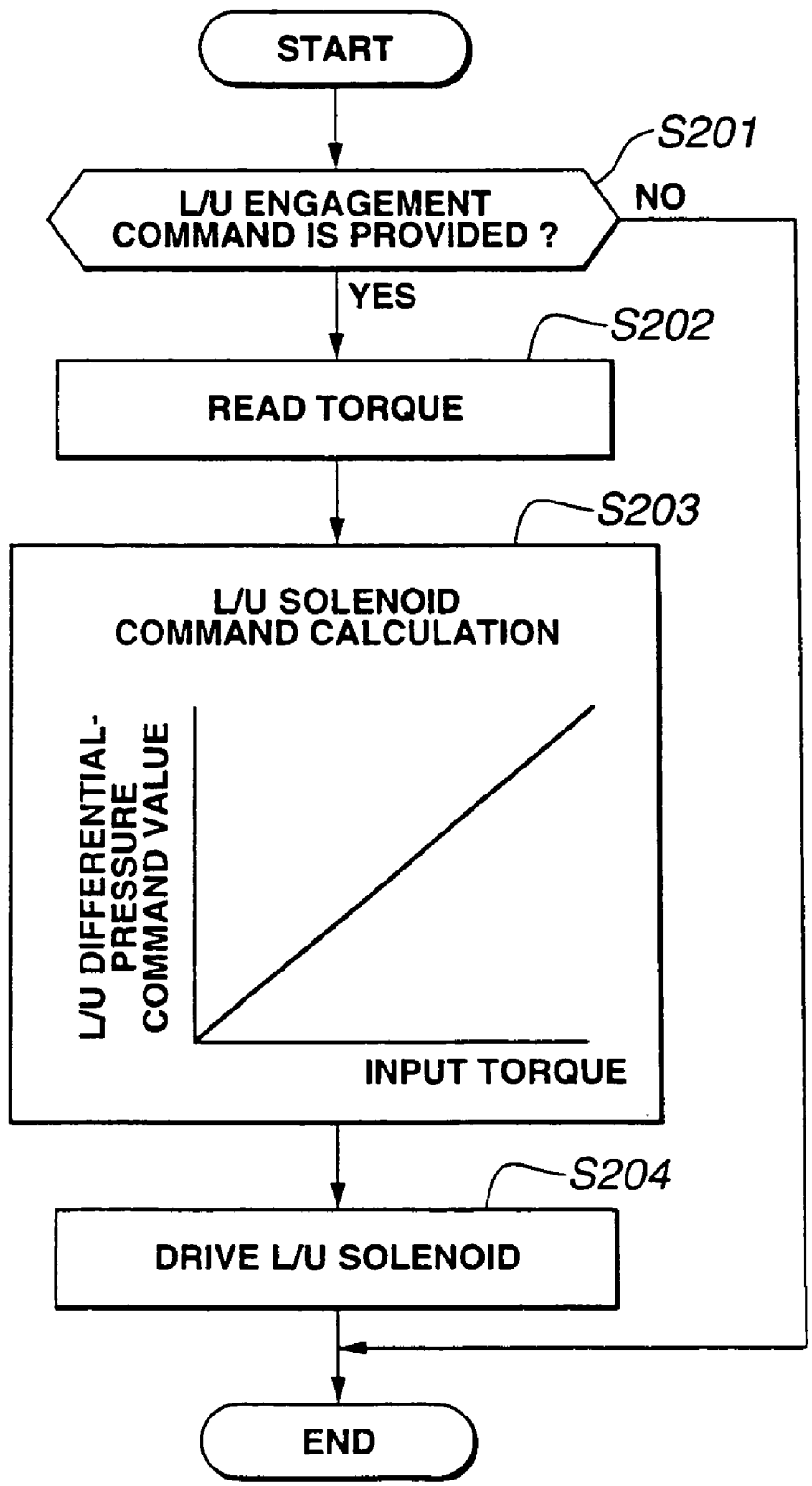
FIG. 3 is a flow chart illustrating operation of the first embodiment.

Referring next to FIG. 3, a description is made about differential-pressure command-value control for the lockup solenoid valve 71 carried out in the CVTCU 9.

At a step S201, it is determined whether or not a command for engaging the lockup clutch 2 is provided. If it is determined that the command is provided, control proceeds to a step S202, whereas if it is determined that the command is not provided, control comes to an end.

At the step S202, the engine torque derived from the ECU 11 (i.e., input torque) is read.

At a step S203, using a map as previously set, a differential-pressure command value for the lockup solenoid 71 is determined in accordance with input torque.

At a step S204, in accordance with the differential-pressure command value, a control signal is provided to the lockup solenoid valve 71.

Figure 4:
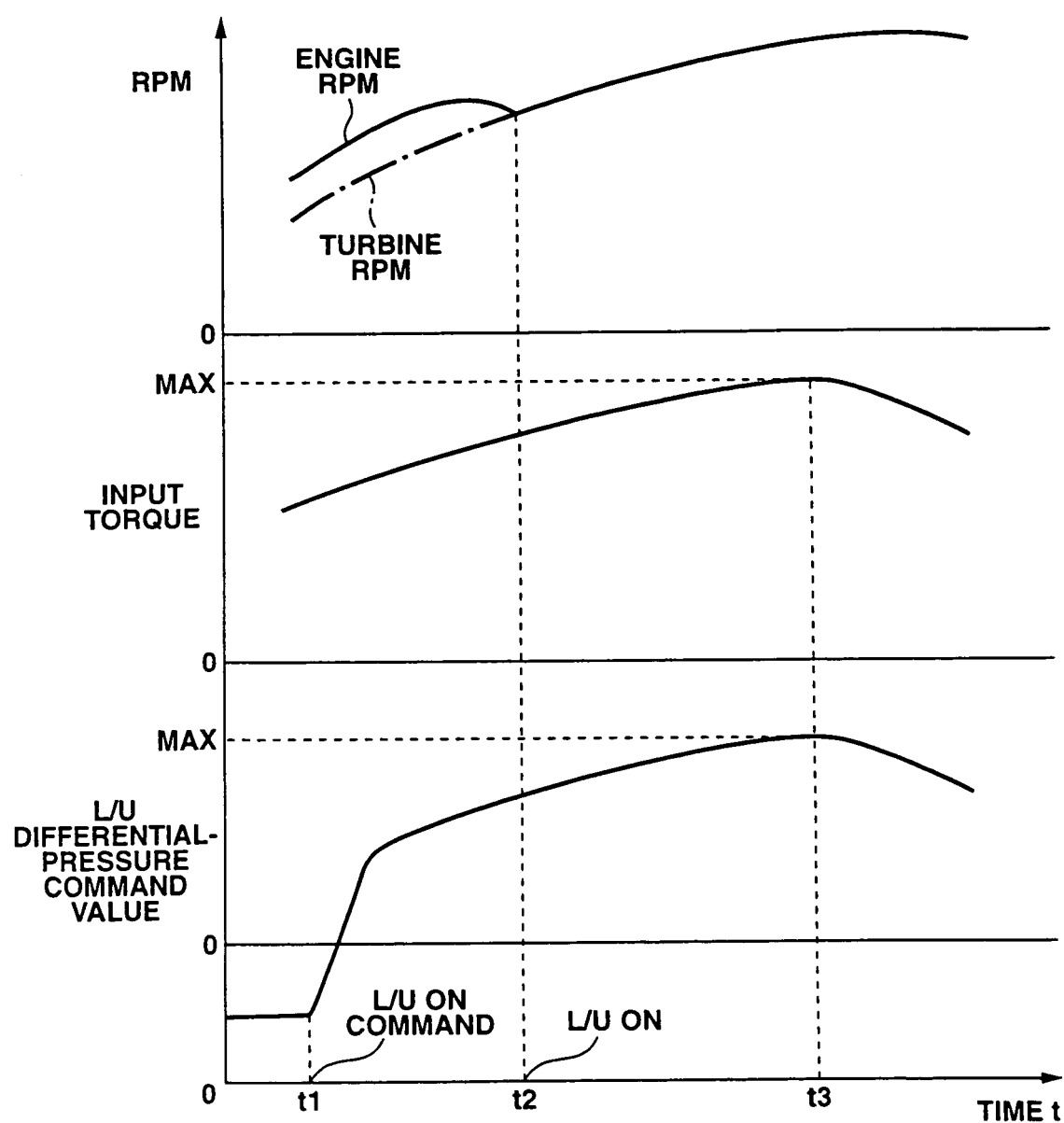
FIG. 4 is a time chart showing operation of the first embodiment.

Referring to FIG. 4, a description is made about operation of differential-pressure command-value control for the lockup solenoid valve 71 carried out in the CVTCU 9.

Referring to FIG. 4, at an instant t1, the vehicle velocity reaches a predetermined value, so that a command for engaging the lockup clutch 2 is provided to the lockup solenoid valve 71. At that time, control is carried out along flow of step S201→step S202→step S203→step S204 in FIG. 3.

At an instant t2, the lockup clutch 2 is engaged.

At an instant t3, input torque has a maximum value, and the differential-pressure command value has a maximum value accordingly.

After the instant t3, with reducing input torque, the differential-pressure command value is reduced. At that time, as engine rotation is higher, the signal pressure of the differential-pressure command value surges. However, since the differential-pressure command value is smaller than the maximum value, a spool of the lockup control valve 100 absorbs surging of the signal pressure, allowing achievement of the control stability of the lockup clutch 2.

As described above, in the first embodiment, the rigidity of the hydraulic passages 72, 82 extending from the lockup solenoid 71 to the lockup control valve 100 (via the select switching valve 80) during high engine rotation can be reduced as compared with the earlier art, thereby enhancing the control stability of the lockup clutch 2 and preventing a disengagement of the lockup clutch 2 due to a surging of the line pressure.

Further, the signal pressure of the lockup solenoid 71 is set at a maximum value when input torque has a maximum value. Thus, in an area where surging of the line pressure is not large, the spool of the lockup control valve 100 can be set at a fully biased position to lower the source pressure of the torque converter 1, resulting in enhancement in fuel consumption.

Referring to FIGS. 5A and 5B, there is shown second embodiment of the present invention which is substantially the same as the first embodiment except that while control of the lockup solenoid 71 is carried out according to an earlier-art method, surging of the signal pressure of the lockup solenoid 71 is absorbed through the structure of the lockup control valve 100.

FIG. 5A shows the state where the lockup control valve 100 does not receive the signal pressure from the lockup solenoid 71. At that time, the spool 120 of the lockup control valve 100 is biased fully rightward as viewed in FIG. 5A by a biasing force of a spring 121. The hydraulic pressure supplied through the hydraulic passage 64 is provided to the hydraulic passage 102, which is supplied, as release pressure, to the torque converter 1.

FIG. 5B shows the state where the lockup control valve 100 receives the maximum signal pressure from the lockup solenoid 71. At that time, the hydraulic pressure supplied from the hydraulic passage 64 is provided to the hydraulic passage 106, which is supplied, as apply pressure, to the torque converter 1.

The spool 120 is moved leftward as viewed in FIG. 5B by the signal pressure of the lockup solenoid 71 received through the hydraulic passage 64. However, the spool 120 is not in a fully biased state, and in a balanced state.

Therefore, in the second embodiment, even if the signal pressure of the lockup solenoid 71 surges when a maximum value of the signal pressure is provided therefrom, the spool 120 can be moved rightward or leftward as viewed in FIGS. 5A and 5B in accordance with the surging, i.e. it can absorb the surging, resulting in achievement of the control stability of the lockup clutch 2.

According to the invention, the control unit controls the signal pressure of the lockup solenoid valve in accordance with torque as determined. Typically, during engine high rotation having surging of the line pressure, engine torque is reduced with increasing engine rpm (refer to FIG. 4). That is, controlling the signal pressure of the lockup solenoid valve in accordance with this characteristic is equal to controlling the signal pressure in such a manner as to reduce a differential-pressure command value for the lockup solenoid.

Thus, during high engine rotation having surging of the line pressure, the spool of the lockup control valve is not in the fully biased state, allowing the lockup control valve to operate as an accumulator for absorbing surging of the signal pressure.

Therefore, the invention can reduce the rigidity of the hydraulic passage extending from the lockup solenoid to the lockup control valve during engine high rotation as compared with the earlier art, enhancing the control stability of the lockup clutch, resulting in prevention of releasing of engagement of the lockup clutch due to surging of the line pressure.

According to the invention, the control unit sets the signal pressure at a maximum value when the torque has a maximum value. Thus, in an area where surging of the line pressure is not large, the spool of the lockup control valve can be set at a fully biased position to lower the source pressure of torque converter, resulting in enhancement in fuel consumption.

According to the invention, even if the signal pressure of the lockup solenoid surges when a maximum value of the signal pressure is provided therefrom, the spool can move in accordance with the surging, i.e. it can absorb the surging, resulting in achievement of the control stability of the lockup clutch.

According to the invention, when the lockup clutch is engaged, the spool is in a movable position before the fully biased position. Thus, even if the signal pressure of the lockup solenoid surges, movement of the spool can absorb the surging, resulting in achievement of the control stability of the lockup clutch.

Having described the present invention in connection with the illustrative embodiments, it is noted that the present invention is not limited thereto, and various changes and modifications can be made without departing from the scope of the present invention.

The entire teachings of Japanese Patent Application P2002-285501 are incorporated hereby by reference.

What is claimed is:

1. A system for controlling a hydraulic pressure of an automatic transmission, comprising:
    a torque converter comprising a lockup clutch, the lockup clutch carrying out direct coupling between an engine and the transmission;
    a lockup solenoid valve that provides a signal pressure for controlling engagement of the lockup clutch;
    a lockup control valve that provides an engagement pressure to the lockup clutch in accordance with the signal pressure, the lockup control valve comprising a spool; and
    a control unit that controls the lockup solenoid valve, the control unit being programmed to control the signal pressure to hold the engagement of the lockup clutch, when the spool of the lockup control valve is stationary in an axially movable position between two fully biased positions and the signal pressure is at a maximum value.

2. An automatic transmission, comprising:
    a torque converter comprising a lockup clutch, the lockup clutch carrying out direct coupling between an engine and the transmission;
    a lockup solenoid valve that provides a signal pressure for controlling engagement of the lockup clutch;
    a lockup control valve that provides an engagement pressure to the lockup clutch in accordance with the signal pressure, the lockup control valve comprising a spool; and
    a control unit that controls the lockup solenoid valve, the control unit being programmed to control the signal pressure to hold the engagement of the lockup clutch, when the spool of the lockup control valve is stationary in an axially movable position between two fully biased positions and the signal pressure is at a maximum value.

3. A method of controlling a hydraulic pressure of an automatic transmission, the transmission comprising:
    a torque converter comprising a lockup clutch, the lockup clutch carrying out direct coupling between an engine and the transmission;
    a lockup solenoid valve that provides a signal pressure for controlling engagement of the lockup clutch; and
    a lockup control valve that provides an engagement pressure to the lockup clutch in accordance with the signal pressure, the lockup control valve comprising a spool,
the method comprising the step of:
    controlling the signal pressure to hold the engagement of the lockup clutch, when the spool of the lockup control valve is stationary in an axially movable position between two fully biased positions and the signal pressure is at a maximum value.

* * * * *